United States Patent [19]

Cutler et al.

[11] 4,295,086

[45] Oct. 13, 1981

[54] METHOD AND APPARATUS FOR DYNAMIC BRAKING IN A MOTOR CONTROL SYSTEM

[75] Inventors: John H. Cutler, Roanoke; Paul M. Espelage; Loren H. Walker, both of Salem, all of Va.

[73] Assignee: General Electric Company, Salem, Va.

[21] Appl. No.: 142,696

[22] Filed: Apr. 22, 1980

[51] Int. Cl.³ ............................................. H02P 3/22
[52] U.S. Cl. ................................... 318/759; 318/758; 318/375
[58] Field of Search ............... 318/808, 757, 758, 759, 318/762, 703, 375; 363/57

[56] References Cited
U.S. PATENT DOCUMENTS 3,688,171  8/1972  Salihi et al. ..................... 318/759

*Primary Examiner*—David Smith, Jr.
*Attorney, Agent, or Firm*—Arnold E. Renner

[57] ABSTRACT

A controlled current inverter motor control system including a controlled source of direct current for supplying a variable frequency inverter by way of a direct current link circuit which includes, within the link circuit, a selectively insertable dynamic braking resistive element. Upon a call for a dynamic braking mode of operation, the source of direct current is short circuited and the normal operational or running control of the motor is discontinued. Special circuitry is provided which then forces a special frequency control of the inverter to thus control the angle between the motor flux and motor current to a prescribed value proportional to the extant value of a motor operating parameter (motor current or motor flux) prior to the insertion of the dynamic braking resistive element into the link circuit.

24 Claims, 7 Drawing Figures

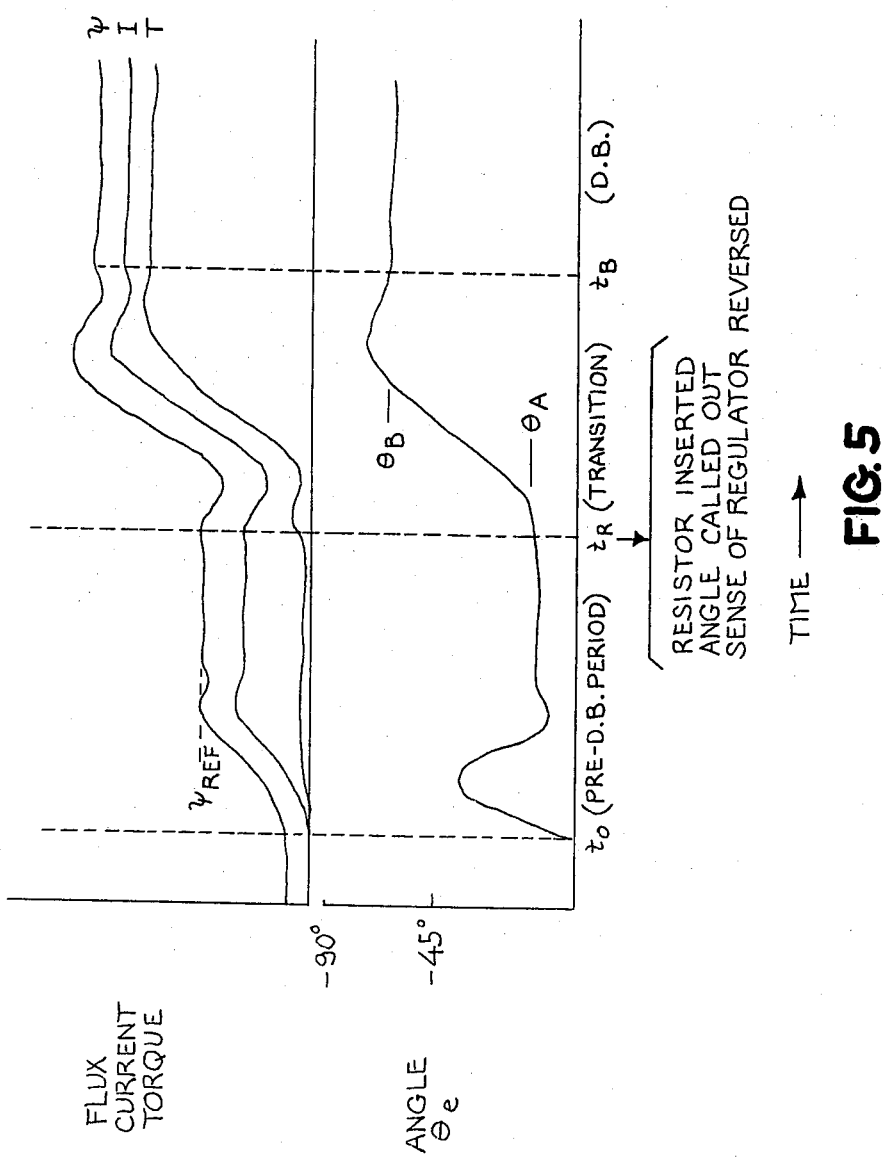

METHOD AND APPARATUS FOR DYNAMIC BRAKING IN A MOTOR CONTROL SYSTEM

CROSS REFERENCE TO OTHER PATENTS

The present invention is an improvement in dynamic braking as applied to a motor control system of the type described and claimed in U.S. Pat. No. 4,230,979 "Controlled Current Inverter An Motor Control System" by P. M. Espelage et al, issued Oct. 28, 1980 and assigned to the assignee of the present invention which application is specifically incorporated hereinto by reference.

BACKGROUND OF THE INVENTION

The present invention relates generally to dynamic braking of an electric motor and more particularly to improved method and apparatus for providing dynamic braking of an induction motor operated by a controlled current inverter system.

Dynamic braking, broadly speaking, is a well-known method of electrically braking an electric motor. It is sometimes used alone but often finds use in conjunction with other braking methods such as regeneration as a supplement to such other braking method when for some reason, the motor power source is unable to accept energy from the motor. In essence, dynamic braking involves the insertion of a resistive element into electrical circuit with the motor such that the motor, now acting as a generator, generates energy which is dissipated in the resistive element.

In the aforementioned U.S. Pat. No. 4,230,979 there is described and claimed a motor control system of the controlled current inverter type which includes dynamic braking and in which a controlled direct current (d.c.) power converter furnished electric power by way of a d.c. link, including a selectively insertable dynamic braking resistor, to an inverter of controllable frequency. In this application, the motor control system is responsive to a torque reference signal. Three control paths responsive to the torque reference signal act to control the motor. A first path is employed to control the d.c. converter and hence the d.c. current within the link. A second path is used to control the frequency of inverter operation to thus control the angle between the motor flux and the motor current (referred to as the air gap power factor angle, $\theta$). The third path is responsive to the torque reference and instantaneous motor flux and serves as a trim function to each of the other paths.

In accordance with the teaching of that U.S. Patent, when dynamic braking is desired, the d.c. converter is short-circuited. At essentially the same time, a speed reference which is used to generate the torque reference is forced to zero and the torque reference is also forced to zero. The dynamic braking resistor is then rendered effective and the torque reference signal again allowed to become effective.

While this system in its basic form is adequate for many situations, it has the potential of becoming unstable in certain instances in that an improper level of flux could exist which, in turn, could result in equipment damage or improper braking action. If, for example, the flux were too high when dynamic braking resistor is inserted, the motor current could become excessive and equipment damage could result. If the flux is too low when the dynamic braking resistor is inserted, the flux could collapse completely and little or no braking action would occur.

SUMMARY OF THE INVENTION

It is, therefore, an object of the present invention to provide an improved method and apparatus for providing dynamic braking in a motor control system.

It is a further object to insure, in a controlled current inverter motor control system, the existence of proper motor flux to effect safe and effective dynamic braking.

It is another object to provide improved dynamic braking in a controlled current inverter type motor control by controlling the air gap power factor of the system immediately prior to the insertion of a dynamic braking resistive element.

A still further object is to provide an improved method and apparatus to provide, in a controlled current motor control system, a dynamic braking scheme which insures proper motor flux prior to insertion of the dynamic braking resistive element to effect an efficient braking action without risk of the excessive motor current.

The foregoing and other objects are achieved, in accordance with the present invention, by providing in a controlled current motor control system assurance that the angle between the motor flux and the motor current (air gap power factor) is proper to provide the correct motor flux at the time of insertion of a dynamic braking resistive element. This is achieved by establishing a "pre-dynamic braking" period and selectively controlling an inverter operating frequency to thereby control the value of a predetermined operating parameter (e.g., current or flux) to thereby maintain the flux at a desired value so that excessive motor currents are not produced and so that effective braking action is achieved.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

FIGS. 3, 4 and 5 are graphical representations useful in understanding the need for the operation of the present invention;

DETAILED DESCRIPTION

Figure 1:
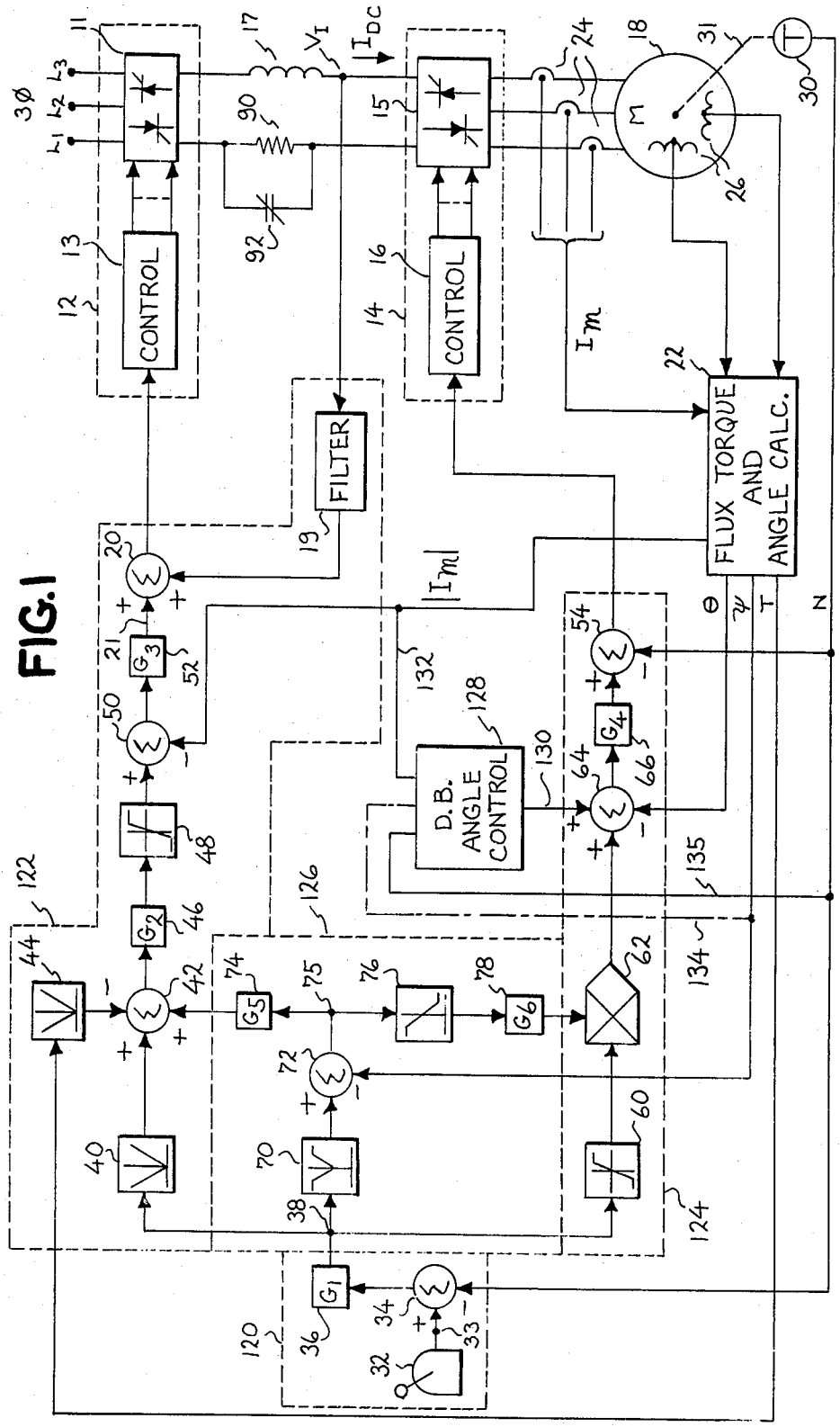
FIG. 1 is a schematic diagram illustrating a controlled current inverter motor control system of the type described in the aforementioned U.S. Patent which further illustrates in block form the present invention.

Reference is now made to FIG. 1 which illustrates the present invention. Those familiar with the aforementioned U.S. Pat. No. 4,230,979 will recognize that the showing in FIG. 1 is essentially identical to that shown and described therein with the exception of the addition of the dynamic braking angle control 128 to be subsequently described. It will also be recognized that insofar as the drawings are identical, the same reference characters have been used and, as such, reference is specifically made to that patent incorporated hereinto by reference for a detailed description of the bulk of the circuitry. However, so that the present invention may be fully understood solely with reference to the present description, briefly, the system includes a source of variable d.c. current 12 which, in FIG. 1 is shown as a converter unit 11 under the control of a suitable control means 13. A current ($I_{DC}$) is supplied from the source 12 by way of a d.c. link circuit, including a suitable filter, for smoothing the d.c. current from the source 12 such as an inductor 17, to a suitable inverter circuit 14 including a converter unit 15 under the control means 16. The output of the inverter circuit 14 is supplied to a load shown in FIG. 1 as a alternating current (a.c.) motor 18. The d.c. link circuit also includes a dynamic braking resistive element or resistor 90 which is connected in parallel with a normally closed shorting contact 92. The dynamic braking mode of operation which constitutes the present invention will be discussed in detail later, it being sufficient for the present to note that when contactor 92 is closed, resistor 90 is effectively not within the d.c. link circuit and that when contactor 92 is open the resistive element is effectively included within the d.c. link circuit.

The d.c. source 12 could be any one of a variety forms such as, for example, a d.c. chopper whose input terminals are coupled to an uncontrolled d.c. source. In such case, the control could be of the time ratio type. The source 12 could also include some means for varying the current emanating from the d.c. source. More commonly, however, the source 12 would be of the form illustrated in FIG. 1 in which the conversion unit is a phase controlled multilegged bridge, for example a six thyristor bridge, which has its input connected to a three phase source as illustrated by the terminals $L_1$, $L_2$ and $L_3$. In this situation, the control could be of that known type which is synchronized with the line voltage and which, under the control of an input signal shown as being derived from a summing junction 20, varies the output by varying the gating angles of the bridge rectifiers in response to that input signal to thereby vary the value of the d.c. current output.

The inverter circuit 14 includes a suitable conversion unit 15 which may also take any suitable form but which most commonly today would also be a six thyristor bridge further including forced commutating means as known in the art. The operating frequency of the unit 15 is shown under the control of the control means 16. One well-known implementation of the control means would include a voltage controlled oscillator feeding a ring counter the output signals of which are used to initiate gating of the thyristors of the bridge. In this well-known type of control, the magnitude of the input signal to the voltage controlled oscillator controls the inverter output frequency. As is understood, the instantaneous air gap power factor, that is the angle between the motor flux and the motor current at the motor load can be varied by changing the inverter output frequency since any difference between the frequency of motor back emg (flux) and the frequency of the inverter will appear as a rate of change of phase angle of current with respect to flux.

Motor 18 is, as earlier indicated, an a.c. motor, preferably an a.c. induction motor. As such, as is well known in the art, the motor will have a stator and a rotor which is separated from the stator by a gap across which flux is developed. In accordance with the teaching of the aforementioned patent, the overall control of the system in the normal mode of operation; i.e., in the normal running condition, four signals find primary application. These signals are, respectively, proportional to air gap flux ($\psi$), the electrical torque (T), the angle between the motor flux and the motor current ($\theta$) and the actual motor speed (N). The three signals $\psi$, T and $\theta$ are derived by suitable calculations in response to motor operating parameters and are shown emanating from block 22 in FIG. 1. The exact circuitry of the block 22 is not of critical importance to the present invention but it may, for example, be that which is shown and described in U.S. Pat. No. 4,088,934, issued May 9, 1978, by J. D. D'Atre, A. B. Plunkett and T. A. Lipo, entitled "Means For Stablizing A. C. Electric Motor Drive System" which patent is assigned to the assignee of the present invention and which application is specifically incorporated hereinto by reference. In accordance with the description in the U.S. Pat. No. 4,230,979 block 22 develops the $\psi$, T and $\theta$ signals as a function of inputs representing motor parameters including the motor current ($I_m$) which is shown in FIG. 1 as being derived from three current sensors 24 associated with the lines connecting the inverter and the motor 18. The other outputs to block 22 are signals proportional to motor flux which are shown as being derived from a pair of flux coils 26 associated with the motor. As illustrated in FIG. 1, in addition to the $\psi$, T and $\theta$ signals, block 22 outputs a signal ($|I_m|$) proportional to the absolute motor current. This signal represents nothing more than the absolute value of the rectified and combined individual values of the signals derived from the three current sensors 24.

A tachometer 30 is shown associated with the motor 18 as indicated by the dashed line 31 and serves as an exemplary means for providing the fourth or motor speed signal (N). Tachometer 30 could be any of those well known in the art, for example, a d.c. tachometer which will provide a steady-state output voltage proportional to the actual speed of the motor.

In accordance with the teachings of U.S. Pat. 4,230,979, basic control of the invention has its origin with the establishment of a torque reference signal which appears at node 38. As earlier indicated, a detailed description of the basic circuitry insofar as it is identical to that of the first cited patent will not be made, reference being made to that patent for complete description if desired. Suffice it to say at the present time that an operator controlled device such as a rheostat 32 establishes a suitable speed reference signal which is compared with the actual speed signal N in a summing junction 34 to provide at junction or node 38 the torque reference signal.

The torque reference signal at junction 38 is applied, in accordance with the aforementioned teachings, to three control paths. The first of these paths, shown within dashed line block 122, is a current or torque control channel or path serving to provide a signal from its summing junction 20 to control the operation of the converter 12 as earlier indicated. The second path, shown within dashed line block 124, is that which controls the frequency of the inverter operation and hence the air gap power factor during normal running operation. This channel causes the motor to run at a specified air gap power factor or at a fixed angle between the motor flux and the motor current. It is into this channel that the present invention operates as will be more fully discussed, and it is noted that an output from its summing junction 54 is applied to the control 16 of the inverter system 14 for the control thereof. The third path into which the torque reference signal at node 38 operates is a trim channel or path shown within the dashed line block 126. This channel is responsive to flux to control the other two channels in a trimming mode to assure that the flux is proper for each torque level.

The final showing in FIG. 1 is block 128 which is the dynamic braking angle control which forms the essence of the present invention. Control 128, which will be described in detail later, provides an output by way of line 130 to summing junction 64 of the frequency control path 124. As illustrated in FIG. 1, the angle control 128 first receives the speed signal N via line 135 and may receive as an input the current signal $|I_m|$ by way of line 132. In this case as will be more fully understood as this description proceeds, the control of the air gap power factor during the pre-dynamic braking period will be a result of the motor current control parameter. As illustrated by the dot-dash line 134 extending from the $\psi$ output of block 22, the angle control 128 may also, as an alternative, be under the control of the motor flux.

Figure 2:
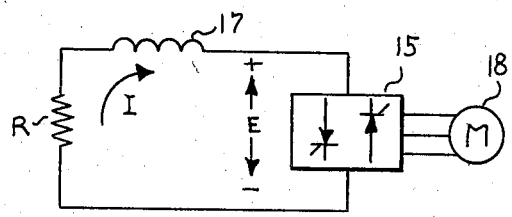
FIG. 2 is a simplified schematic diagram illustrating the motor current path during dynamic braking.
Figure 3:
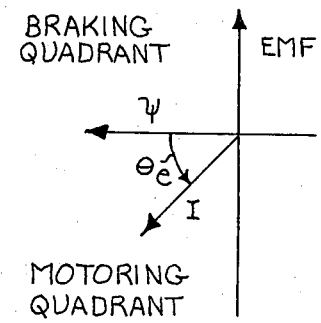

Before describing the specific method and apparatus of the present invention a brief discussion of the theory which makes the present invention desirable is believed appropriate. FIG. 2 shows a simplified equivalent circuit of the system during the dynamic braking period when no power is available except from the motor 18 and when the d.c. source is short circuited. FIG. 3 shows a simplified vector diagram of motor flux and motor current. From these figures the basic equations for a phase controlled thyristor bridge and an induction motor and the expressions defining operation can be written. It is noted that these expressions are simplified by the assumption that the d.c. link inductor 17 makes the current in the resistive portion (R) of the circuit, which represents all the d.c. resistance including the effective commutating resistance of the inverter, responsive only to the d.c. component of the voltage E and not to any instantaneous ripple voltage. It is also to be noted in these figures that the voltage E is the d.c. terminal voltage of the inverter 15 and that its polarity in dynamic braking is reversed from that shown which is the normal polarity for operation. In the equations which follow the following terminology will be used.

| | |
|---|---|
| I | = d.c. current |
| E | = d.c. voltage |
| R | = all d.c. resistance including effective commutating resistance of the inverter |
| $\psi$ | = motor flux magnitude |
| $\theta_e$ | = angle between the stator current vector and the air gap flux vector |
| f | = stator frequency |
| T | = torque |
| $K_\psi$, $K_V$, $K_T$ | = constants related to motor geometry determinable from the individual motor used |
| < | = less than |
| > | = greater than. |

From FIGS. 2 and 3 and using the terminology set forth above, the following basic expressions may be written for static conditions of the circuit.

$$\psi = K_\psi I \cos \theta_e \quad (1)$$

$$E = K_V f \psi \sin \theta_e \quad (2)$$

$$I = -\frac{E}{R} = -\frac{K_V f}{R} \psi \sin \theta_e \quad (3)$$

$$T = K_T I \psi \sin \theta_e \quad (4)$$

From equation (1), for the flux to be positive:

$$-90° < \theta_e < +90° \quad (5)$$

From equation (4), for the torque to be negative, that is, the system is in the braking mode of operation:

$$-180° < \theta_e < 0° \quad (6)$$

As such, the operating quadrant for dynamic braking is:

$$-90° < \theta_e < 0° \quad (7)$$

Equations (1) and (3) above can be solved simultaneously to determine the value of angle $\theta_e$ which will result in a stable operating point. Specifically from equations (1) and (3):

$$I = \frac{-K_V K_\psi f}{R} I \cos \theta_e \sin \theta_e \quad (8)$$

$$1 = \frac{-K_V K_\psi f}{R} \tfrac{1}{2} \sin 2\theta_e; \text{ and,} \quad (9)$$

$$\sin 2\theta_e = \frac{-2R}{K_V K_\psi f} \quad (10)$$

Figure 4:
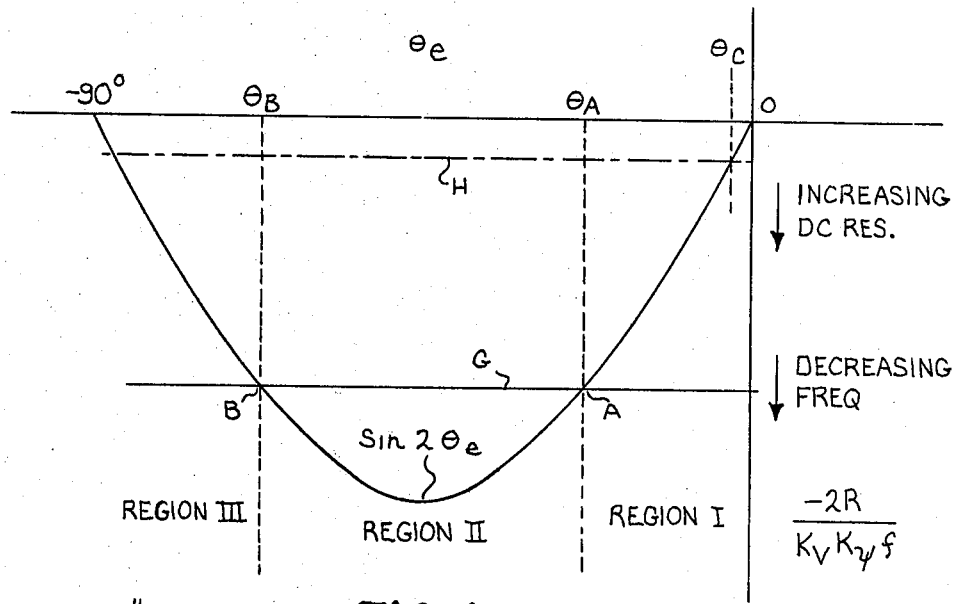

Expression (10) shows that for each value of resistance and frequency there is only one stable value of Sin $2\theta_e$. Since $\theta_e$ has the range as indicated by relationship (7), this allows two stable values of $\theta_e$. Reference is now made to FIG. 4 which plots, in the third quadrant, the angle $\theta_e$ as the abscissa versus the function $-2R/K_V K_\psi f$ as the ordinate. This function increases negatively for increasing d.c. resistance or decreasing frequency as shown. The horizontal line G designates a specific value of $-2R/K_V K_\psi f$ and establishes by its intersection with the curve Sin $2\theta_e$ two stable operating points A and B where the equality of expression (10) is satisfied. Expression (10) and FIG. 4, however, give no information as to the magnitudes of flux, current or torque which occur at either operating point. These magnitudes will be determined by the path (in time) by which the particular stable operating point is reached. It can be shown, however, that for effective dynamic braking, point B ($-90° > \theta_e < 45°$) is to be preferred over point A. If the values of the flux and the current can be maintained at maximum levels at either point, then torque, in accordance with expression (4) above, will be higher at point B because torque is proportional to Sin $\theta_e$. It is also evident from FIG. 4 and expression (10) that there is a maximum value of resistance at which dynamic braking operation is possible at a given frequency with a given motor. This value of resistance is found by setting Sin $2\theta_e$ to $-1$, its maximum value. When this is done, equation (10) reduces to:

$$R = \tfrac{1}{2} K_V K_\psi f \quad (11)$$

As shown in FIG. 4, the broken vertical lines extending from stable points A and B divide the angle range $0 > \theta_e > -90°$ into three regions. In region I, where $0 > \theta_e > \theta_A$, the angle $\theta_e$ is so small that the d.c. voltage generated will result in a d.c. current which is too small to maintain the existing level of flux. Since this is true at all levels of flux, continued operation in this region will cause the motor flux to be driven to zero. The rate of collapse of current and flux is determined by the value of the d.c. link inductrance 17. In region II, where $\theta_A > \theta_e > \theta_B$, the d.c. voltage generated by the operation of the inverter and the motor causes a d.c. current which is larger than necessary to make the flux and continued operation in this region will cause the flux to build to saturation level. If the motor speed is high, the motor voltage produced by the saturation level of flux may damage the inverter. In region III, where $\theta_B > \theta_e > -90°$. the d.c. current may be high but its effect in building flux is small because the angle $\theta_e$ is approaching $-90°$. As shown by expression (1), as the angle $\theta_e$ approaches $-90°$, Cos $\theta_e$ approaches zero, and the flux will not be maintained.

With the foregoing in mind, it is seen that the solution to achieving effective dynamic braking mode of operation in the controlled inverter motor control system is that of reaching the desired operating point B (FIG. 4) without collapsing the existing flux in getting through region I and without damaging the inverter with excessive voltage in getting through region II. It must be further remembered, however, that there must be a proper choice in the sense or polarity of the control since, if the control senses the current or flux and increases the angle (drives the angle away from zero) when the flux or current is too small then the control will be stable at point A but unstable at point B. If the opposite sense of control was chosen, then the control will be stable at point B and unstable at point A.

With the foregoing in mind, the approach taken in accordance with the present invention involves operation using at lest two values of resistance so that operations at both points A and B are achieved in a desired sequence. The dynamic braking mode of operation is entered from a pre-dynamic braking period during which the condition of angle $\theta_e$ is equal to or approximates zero and the flux may be of any value. The most difficult condition is when flux is small and the current is zero. To build flux to an operating level in this case, the control must quickly traverse region I of FIG. 4 and operate just beyond the point $\theta_A$ to build flux. This is a very difficult traversal since the angle $\theta_A$ is a function of frequency and resistance. To make this step controllable at all frequencies in accordance with the present invention, the value of the effective resistance in the pre-dynamic braking period is set to a very small value; that is, all intentional resistance is excluded. This brings line G representing the resistance up close to the abscissa. In FIG. 4 this is represented by the dot-dash line H and brings the angle very close to zero as indicated at $\theta_C$. This, in effect, widens region II to encompass almost the entire quadrant. In this condition, regulation in the proper sense (to increase angle to increase flux or current) can be applied to build flux or current to a desired value and the regulator will be stable as long as $\theta_e$ is between zero and minus 45°. This mode of operation established a desired operating level of flux or current but makes very little braking torque since the term Sin $\theta_e$ in the torque expression (4) is very small. FIG. 5 illustrates the sequence followed in getting into the dynamic braking mode of operation in accordance with the present invention during the time period indicated between $t_O$ and $t_R$.

To enter into the torque producing mode, the value of resistance must be increased within the d.c. link circuit, the sense of the control of the angle must be reversed (increasing angle to decrease flux) and the angle must be forced to the vicinity of point B (FIG. 3) where it will be stable. This is illustrated in FIG. 5 starting at time $t_R$ at which time the dynamic braking resistor 80 of FIG. 1 will be inserted into the d.c. link. The first effect of inserting the resistor 90 is to attentuate both current and flux. The rate of change of current is limited by the d.c. link inductance, primarily inductance 17. Simutaneously, the angle is placed under control of a flux error signal (junction 75 at FIG. 1) as described in the aforementioned U.S. Pat. No. 4,230,979. This commands the angle to be at approximately the value of $\theta_B$ as shown in FIG. 4. As the angle passes through region II (FIG. 4) the flux and current build rapidly as shown in FIG. 5 until at time $t_B$ the regulator gains control of the angle and both current and flux are at the desired values. It is noted that the initial value of flux established before time $t_R$ in FIG. 5 must be large enough to avoid going to a zero flux level immediately after $t_R$. It must not, however, be too large or the flux will overshoot in value and the current at time $t_B$ may be too large and result in rendering the circuit inoperative by some means not shown such as an overcurrent protection device.

Figure 6:
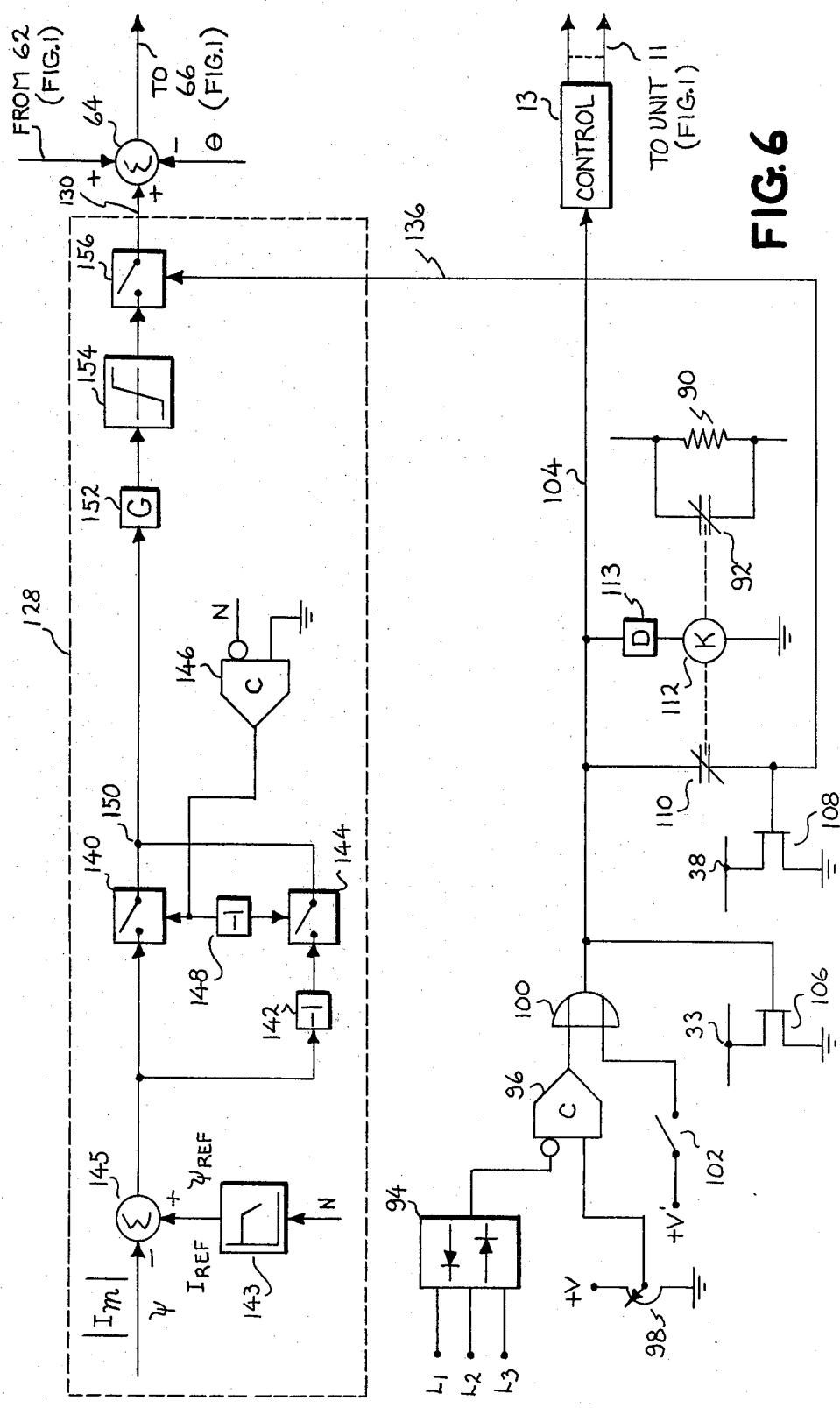
FIG. 6 is a schematic diagram depicting the dynamic braking circuitry in basic accordance with the aforementioned U.S. Pat. No. 4,230,979 and which also includes a preferred embodiment of the improvement of the dynamic braking feature in accordance with the present invention shown in block form in FIG. 1; and, FIG. 7 is a schematic diagram illustrating one possible modification of the circuitry of FIG. 6.

The means by which the dynamic braking is achieved in accordance with the preferred embodiment of the present invention is illustrated in FIG. 6. Those familiar with the aforementioned U.S. Pat. No. 4,230,979 will recognize that the circuitry shown, excluding that associated with the dashed line block 128, is essentially identical to that shown and described therein with the exception of a delay means 113 which will be described later. Referencing now FIG. 6, the three phase source, again represented by terminals $L_1$, $L_2$ and $L_3$ is shown connected to a signal level rectifier 94 such that the output of the rectifier is a signal having level proportional to the source voltage. This signal is applied as one input to a simple voltage comparator 96, for example an operational amplifier connected in the voltage comparison mode. The second input to the comparator 96 is shown as being derived from the wiper arm of a potentiometer 98 which is connected between a source of positive potential ($+V$) and ground. Potentiometer 98 represents any suitable means for developing a signal representing a safe operational level of the motor drive of FIG. 1. This level may be, for example, at seventy percent of the normal voltage at terminals $L_1$, $L_2$ and $L_3$. As such, in the embodiment illustrated, comparator 96 will provide a high level signal only when the voltage from potentiometer 96 exceeds that from the rectifier 94.

The output from comparator 96 forms one input to an OR function circuit represented by gate 100 which has a second input connected to an additional source of positive potential ($+V'$) by way of a switch 102. This portion of the depiction is included solely for purposes of illustrating a complete typical system and as such switch 102 represents a command source for an "emergency stop". Thus, when either comparator 96 is providing a high level output signal or when switch 102 is closed, gate 100 will present a high level signal on a bus 104 which signal, herein designated a "braking signal", specifies that the system of FIG. 1 will enter into the dynamic braking mode of operation.

As shown in FIG. 6, the braking signal on bus 104 is simultaneously applied to several channels to effect various operations. First, this braking signal acts to force the speed reference signal (point 33 of FIGS. 1 and 6) to a value specifying zero speed. In FIG. 6 this is illustrated by the connection of point 33 to ground by way of a suitable switching means shown as a field effect transistor (FET) 106. If FET 106 is in the enhancement mode, the application of the positive braking signal to its gate will place the FET into conduction and thus pull point 33 to ground potential. A second application of the braking signal on bus 104 is to the control 13 of the d.c. source 12. Control 13 is so constructed and arranged that the receipt of a positive signal by way of bus 104 will result in the short circuiting of the output of unit 11. The manner in which this short circuiting occurs will, of course, depend upon the nature of unit 11 and the means provided but if, as an example, the unit were a phase controlled multi-legged thyristor bridge as suggested in the preferred embodiment, short circuiting could be achieved by simultaneously firing all thyristors in a leg.

A third application of the braking signal on bus 104 is to the gate of an additional switch, shown as a FET 108, by way of a normally closed contact 110. The source-drain circuit of FET 108 connects point 38 (FIG. 1) to a value representing a demand for zero torque (e.g., ground) in the same manner as FET 106 connects point 33 to ground.

A fourth employment of the signal on bus 104 is to operate the contacts 92 and 110. This is symbolically illustrated in FIG. 6 by the application of this signal to a coil 112 by way of a delay 113 such that the coil is energized to effect the opening of the two contacts 110 and 92, thus removing the forced zero torque reference signal and inserting the resistor 90 into the d.c. link circuit (FIG. 1). Delay 113, in the actually implemented embodiment of the present invention, was simply a fixed time delay which prevented operation of coil 112 and thus the contacts 92 and 110 for a period of time sufficient to allow the pre-dynamic braking period to take effect; i.e., to allow the circuit 128 (to be subsequently described) to be effective. However, as will be described with respect to FIG. 7, it is seen that the effect of delay 113 may also be achieved by sensing certain operating parameters of the motor to allow this period to be determined.

The last application of the signal on bus 104 is by way of contact 110 and line 136 as the operational control to an analog switch 156 within the dynamic braking angle control circuit 128 of the present invention. Analog switch 156, as is the case of all the analog switches employed within this block, may be of the standard commercial type. Operation of the switch 156 will permit the application of the signal from the dynamic braking angle control 128 to summing junction 64 shown in both FIG. 1 and FIG. 6.

The signal to be applied from the angle control 128, is developed as a function of a designated motor operating parameter which, in FIG. 6, is shown as emanating from a summing junction 145. If current is to be the controlling operating parameter, junction 145 combines the $|I_M|$ signal with a suitable reference, $I_{ref}$, whereas if flux is to be the operating parameter, then junction 145 combines the $\psi$ signal with a suitable reference $\psi_{ref}$. In either case the reference signal will be derived from an appropriate source such as an operator settable potentiometer or may be derived from a motor operating parameter such as speed illustrated by the transfer function block 143. The output (error signal) from junction 145 is first applied to an analog switch 140 and additionally, by way of a suitable inverter circuit 142, to a second analog switch 144. In that operation is desired regardless of motor direction, appropriate action must be taken to insure that the signal applied to the summing junction 64 of FIG. 1 is of the correct polarity. As such, the speed signal N acting as a direction signal serves as an input to the inverting input of a simple comparator 146, the second input of which is connected to ground. In this instance the speed signal magnitude is not of importance, since only the relative polarity is sensed designating motor rotation direction. The output of comparator 146 is indicative of the direction of rotation. The output of comparator 146 serves as a switching control for each of the analog switches 140 and 144. This output is applied directly to switch 140 and by way of an inverter 148 to the switch 144. Thus, it is seen that dependent upon the direction of rotation of the motor one or the other of the two switches 140 and 144 will be activated to pass the parameter signal as applied to the circuit from the summing junction 145 to node 150 of the circuit. This insures that the signal at 150 will be of the proper polarity for the existing direction of motor rotation.

The signal appearing at node 150 is applied to a gain circuit 152 which will vary in accordance with the operating parameters used as an input to the circuit 128. If that input parameter signal is current, then circuit 152 may comprise merely a simple amplifier having a gain suitable to scale the signal for proper application and level to the summing junction 64 and hence to the frequency control 14 of FIG. 1. If the flux is used as the operating parameter, then circuit 152 becomes somewhat more complex and will normally have a transfer function (G) such as:

$$G = \frac{(1 + T_1 S)}{(1 + T_2 S)}$$

wherein:
S = Laplace transform operator
$T_1$ = a time constant
$T_2$ = a time constant smaller than $T_1$.

The output of the gain circuit 152 serves as an input to a suitable limiter 154 which insures that the output of the circuit 128 will not attain values beyond which the control 16 is capable of handling. This limiting circuit 154 need not be symmetrical with respect to the axis depending upon the nature of the control 16. The output of limiting circuit 154 is applied by way of the switch 156 to the summing junction 64 as earlier described.

Thus it is seen that with the occurence of the signal on bus 104 indicating a desired operation of dynamic braking, both the speed control and the torque control associated with normal operating conditions are immediately rendered ineffective by operation of the two FETs 106 and 108. However, at this time switch 156 in circuit 128 is closed along with the appropriate switch 140 or 144 depending upon direct of motor rotation such that the parameter signal forming the input to the circuit 128 is operational alone to serve as a control by way of summing junction 64 to the frequency control 16 of the inverter system 14. It will be remembered that because of delay 113 the dynamic braking resistor 90 is not yet inserted into the d.c. link and thus the operating parameter by way of the angle control circuit 128 is solely effective to control the frequency of the inverter and to force the angle $\theta$ to the value prescribed by that operating parameter. After the delay period of delay 113 which is adequate to establish the proper motor current and flux, coil 112 is rendered effective, thus opening switches 110 and 156 and opening switch 92 to place the dynamic braking resistor 90 into the d.c. link circuit and restore the effectiveness of flux control (block 126 of FIG. 1), defeating the parameter control of circuit 128. The latter condition will continue until the end of the dynamic braking period at which time the removal of the signal from bus 104 will return the overall controlled current inverter system to an operational state in accordance with the controlling parameters at that time.

Figure 7:
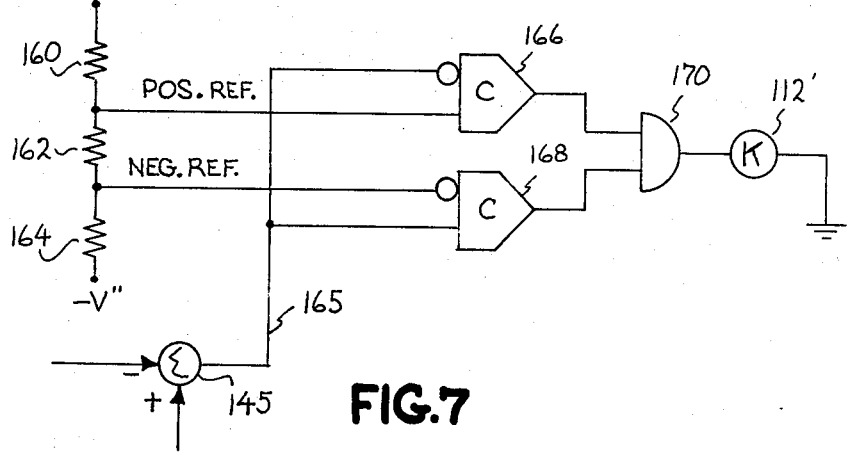

FIG. 7 illustrates the earlier alluded to modification of the circuitry of FIG. 6 in which an operating parameter, either current or flux, is utilized in place of the delay means 113 of FIG. 6 to control the operation of coil 112. In FIG. 7, two reference voltages, Positive Reference and Negative Reference, are developed through the use of a voltage divider circuit comprised of resistor 162 and equal valued resistors 160 and 164 connected between equal absolute magnitude sources of voltage $+V''$ and $-V'''$. The two reference voltages define the acceptable range of the error in control parameter $\psi$ or $|I_M|$. Two comparators 166 and 168 compare, via lines 165, the value of the error in the selected parameter derived, for example, from summing junction 145 (FIG. 6) to these two references and via an AND gate 170 serve to actuate the coil 112' which would operate contacts 92 and 110 of FIG. 6. In this particular embodiment, coil 112' would be a latching relay which will be reset at the end of the dynamic braking period. Thus, it is seen that in the operation of this circuit, coil 112 would not be operated until such time as the current (or flux as the case may be) reaches a desired value for operation of the coil. In all other respects, the operation of this embodiment would be identical to that described with respect to FIG. 6.

While there have been shown and described what are at present considered to be the preferred embodiments of the present invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. In a control for an alternating current electric motor having a stator and a rotor spaced from the stator by a gap across which motor flux is produced in response to an electrical current of variable magnitude and frequency through windings associated with said stator, said control comprising:
   (a) a d.c. source for providing a direct current of variable magnitude;
   (b) a power converter for supplying a variable frequency electrical current to said motor;
   (c) a d.c. link for connecting said d.c. source to said power converter whereby said direct current of variable magnitude is supplied from said source to said converter, said d.c. link including a resistive element and switch means for selectively including and excluding said resistive element into and from said d.c. link;
   (d) means to sense prescribed motor operating parameters and provide signals proportional thereto;
   (e) control means for controlling said power converter to thereby control the frequency of said electrical current supplied to said motor as a function of motor operating parameters;
   (f) means to provide a braking signal designating a dynamic braking action of said motor; and,
   (g) means responsive to said braking signal to:
      (1) short circuit said d.c. source,
      (2) render ineffective normal control of said control means,
      (3) effect a braking control signal to said control means to thereby control the frequency of the electrical current supplied to said motor at a value determined by the value of a designated operating parameter, and
      (4) subsequently, operating said switch means to thereby include said resistive element in said d.c. link.

2. The invention in accordance with claim 1 wherein said designated operating parameter is motor current and wherein said means responsive to said braking signal includes means responsive to a signal proportional to the extant motor current to develop said braking control signal to thereby effect said braking control of said control means.

3. The invention in accordance with claim 2 further including:
   (a) means to sense direction of rotation of said motor and to provide a direction signal indicative thereof; and,
   (b) polarity means within said means responsive to said braking signal, said polarity means being responsive to said direction signal for insuring the proper polarity of said braking control signal.

4. The invention in accordance with claim 1 wherein said designated operating parameter is motor flux and wherein said means responsive to said braking signal includes means responsive to a signal proportional to the extant motor flux to develop said braking control signal to thereby effect said braking control of said control means.

5. The invention in accordance with claim 4 further including:
   (a) means to sense direction of rotation of said motor and to provide a direction signal indicative thereof; and,
   (b) polarity means within said means responsive to said braking signal, said polarity means being responsive to said direction signal for insuring the proper polarity of said braking control signal.

6. The invention in accordance with claim 1 wherein said means responsive to said braking signal includes a delay means whereby the operation of said switch means is delayed for a prescribed period of time subsequent to the occurrence of said braking signal.

7. The invention in accordance with claim 1 wherein said means responsive to said braking signal includes means responsive to a selected motor operating parameter to effect the operating of said switch means.

8. The invention in accordance with claim 7 wherein said selected operating parameter is motor current and wherein said means responsive to said braking signal includes:
   (a) means to provide a reference signal proportional to a desired value of motor current;
   (b) means responsive to said reference signal and a signal proportional to the extant motor current to provide an output signal; and,
   (c) comparator means responsive to said output signal to effect the operating of said switch means where said signal proportional to the extant motor current reaches a prescribed value.

9. The invention in accordance with claim 7 wherein said selected operating parameter is motor flux and wherein said means responsive to said braking signal includes:
   (a) means to provide a reference signal proportional to a desired value of motor flux;
   (b) means responsive to said reference signal and a signal proportional to the extant motor flux to provide an output signal; and,
   (c) comparator means responsive to said output signal to effect the operating of said switch means were said signal proportional to the extant motor flux reaches a prescribed value.

10. The invention in accordance with claim 1 further including means to sense direction of rotation of said motor and to provide a direction signal indicative thereof and wherein said means responsive to said braking signal includes means to effect said braking control signal comprising:
    (a) means to develop first and second signals representing the value of said designated operating parameter, said first and second signals having substantially the same magnitude but being of opposite relative polarity;
    (b) means responsive to said direction signal to provide switching signals as a function of said direction signal;
    (c) first and second switches responsive to said switching signals to pass only a one of said first and second signals;
    (d) means to scale the passed one of said first and second signals;
    (e) limiting means for limiting the value of the passed one of said first and second signals; and
    (f) an additional switch responsive to the presence of said braking signal to convey the passed one of said first and second signals to thereby control the frequency of the electrical current supplied to said motor.

11. The invention in accordance with claim 10 wherein said designated operating parameter is motor current and wherein said means to scale includes amplifying means having a prescribed gain.

12. The invention in accordance with claim 10 wherein said designated operating parameter is motor flux and wherein said means to scale provides a transfer function (G) defined by the equation:

$$G = \frac{(1 + T_1 S)}{(1 + T_2 S)},$$

wherein:
S = Laplace transform operator
$T_1$ = a time constant
$T_2$ = a time constant smaller than $T_1$.

13. In a control, for an alternating current electric motor of the type having a stator and a rotor spaced from the stator across which flux is produced, of the type in which electrical power of variable magnitude and frequency is furnished to said motor from a controllable, variable frequency inverter which is supplied with variable magnitude direct current from a source by way of a link circuit including a selectively effective dynamic braking resistive element, means for effecting a dynamic braking mode of motor operation comprising:

(a) sensing means to sense motor operating parameters and to produce signals representative thereof;
(b) control means associated with each of said source and inverter responsive to selected motor operating parameter signals to control said source and said inverter during normal operating conditions of said motor;
(c) means to provide a braking signal when said dynamic braking mode is desired;
(d) first means responsive to said braking signal operative to short circuit said source at the link circuit;
(e) second means responsive to said braking signal operative to render the normal control of said inverter by the operating parameter signals ineffective; and,
(f) third means responsive to said braking signal operative to effect the dynamic braking mode of operation, said third means including:
   (1) means, responsive to a selected one of said operating parameter signals, operative to effect a prescribed frequency of inverter operation in response to that parameter signal;
   (2) means to render said dynamic braking resistive element effective subsequent to the inverter achieving operation at the prescribed frequency; and,
   (3) means to render said inverter subject to a selected one of said operating parameter signals used during normal operating conditions upon rendering said resistive element effective.

14. The invention in accordance with claim 13 wherein said sensing means to sense motor operating parameters includes means to sense motor current and to produce a current signal proportional thereto and wherein said means responsive to effect the prescribed frequency of inverter operation includes means responsive to said current signal.

15. The invention in accordance with claim 13 wherein said sensing means to sense motor operating parameters includes means to sense motor flux and to produce a flux signal proportional thereto and wherein said means responsive to effect the prescribed frequency of inverter operation includes means responsive to said flux signal.

16. The invention in accordance with claim 13 wherein said means to render said dynamic braking resistive element effective includes delay means for rendering said element effective after a predetermined time from the occurence of said braking signal.

17. The invention in accordance with claim 13 wherein said means to render said dynamic braking resistive element effective includes means responsive to a signal representing a prescribed motor operating parameter to render said element effective when said signal reaches a prescribed value.

18. The invention in accordance with claim 13 further including means to generate a direction signal indicative of direction of motor operation and wherein the means responsive to a selected one of said operating parameter signals includes means to develop first and second control signals of substantially equal magnitude but of relatively opposite polarity and switch means responsive to said direction signal to select a one of said first and second control signals for use in the frequency control of said inverter.

19. A method for providing a dynamic braking mode of operation of an alternating current electric motor of the type having a stator and a rotor spaced from said stator across which flux is produced in response to an electrical motor current comprising the steps:

(a) providing a direct current;
(b) delivering said direct current to a variable frequency inverter by way of a link circuit having a selectively effective resistive element;
(c) providing signals proportional to motor operating parameters;
(d) generating a braking signal operative to initiate a dynamic braking action of said motor;
(e) forcing a prescribed frequency of operation of said inverter in response to said braking signal and as a function of a selected one of said signals proportional to motor operating parameters; and,
(f) rendering said resistive element effective subsequent to the forcing of said inverter.

20. The method in accordance with claim 19 wherein said step of rendering the resistive element effective includes the step of providing a delay of a predetermined time subsequent to the generation of said braking signal.

21. The method in accordance with claim 19 wherein the step of rendering the resistive element effective includes the step of determining when the value of a selected one of the signals proportional to motor operating parameters reaches a prescribed level to thereby effect the rendering of said resistive element effective.

22. The method in accordance with claim 19 further including the step of generating a direction signal indicative of the direction of motor rotation and wherein the step of forcing a prescribed frequency of inverter operation includes the steps of:

(a) generating first and second control signals of substantially equal magnitude and of relative opposite polarity, each of said control signals having a value proportional to a prescribed one of said signals proportional to motor operating parameters; and,
(b) selecting a one of said first and second control signals, as a function of said direction signal, as a control signal to effect the forcing of the prescribed frequency of inverter operation.

23. The method in accordance with claim 22 wherein said first and said second control signals are generated in response to motor current.

24. The method in accordance with claim 22 wherein said first and said second control signals are generated in response to motor flux.

* * * * *